United States Patent Office 3,144,469
Patented Aug. 11, 1964

3,144,469
4,4-DIALKYL-17β-HYDROXY-ANDROSTANE 3-ONE AND DERIVATIVES THEREOF
Howard J. Ringold and George Rosenkranz, Mexico City, Mexico, assignors, by mesne assignments, to Syntex Corporation, a corporation of Panama
No Drawing. Filed Feb. 19, 1957, Ser. No. 641,038
19 Claims. (Cl. 260—397.4)

The present invention relates to cyclopentanophenanthrene derivatives and to a process for the production thereof.

More particularly the present invention relates to novel hormones of the androgenic type which have a high ratio of anabolic to androgenic activities. The novel compounds of the present invention are members of the androstane series having 4,4'-dialkyl substituents and include, 4,4'-dialkyl-Δ⁵-androsten-17β-ol-3-one, 4,4'-dialkyl-androstan-17β-ol-3-one, 4,4'-dialkyl-Δ⁵-androsten-3β,17β-diol, 4,4'-dialkyl-androstan-3β,17β-diol, the 17α-alkyl derivatives of these compounds and esters of those compounds having esterifiable (non-tertiary) hydroxyl groups.

In accordance with the present invention it has been discovered that the novel compounds just described may be prepared by reacting testosterone or a 17α-lower alkyl derivative of testosterone with an alkyl iodide in a tertiary alcohol in the presence of a potassium t-alkoxide to form the corresponding novel 4,4'-dialkyl derivative. Further in accordance with the present invention upon hydrogenation in the presence of a hydrogenation catalyst there is formed the corresponding 4,4'-dialkyl androstane derivatives and the Δ⁵-androstene derivatives upon treatment with a reducing agent such as sodium borohydride give the corresponding novel 3β-hydroxy compounds.

The novel compounds of the present invention may therefore be characterized by the following formula:

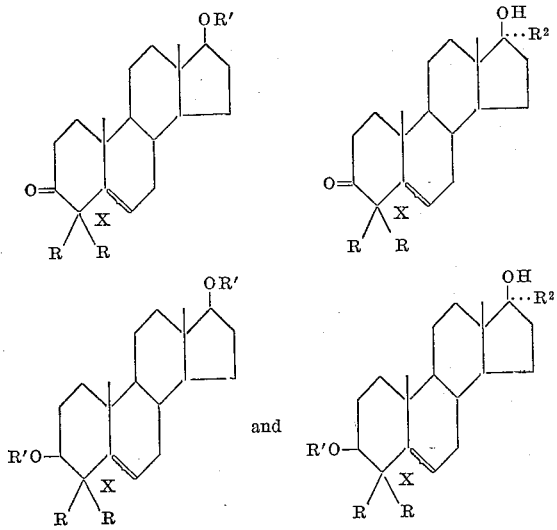

In the above formulas R represents an alkyl group, preferably a lower alkyl group of less than 7 carbon atoms such as methyl, ethyl or propyl. R' represents hydrogen or an acyl group of the type conventionally found in an esterified steroid alcohol. These are generally those derived from hydrocarbon carboxylic acids of less than 12 carbon atoms such as acetic, propionic, cyclopentylpropionic, benzoic etc. X represents a saturated C—5, C—6 linkage or a double bond in this position. R² represents a lower alkyl group of less than 7 carbon atoms such as methyl, ethyl or propyl.

The novel compounds of the present invention may be prepared by a process exemplified by the following equations:

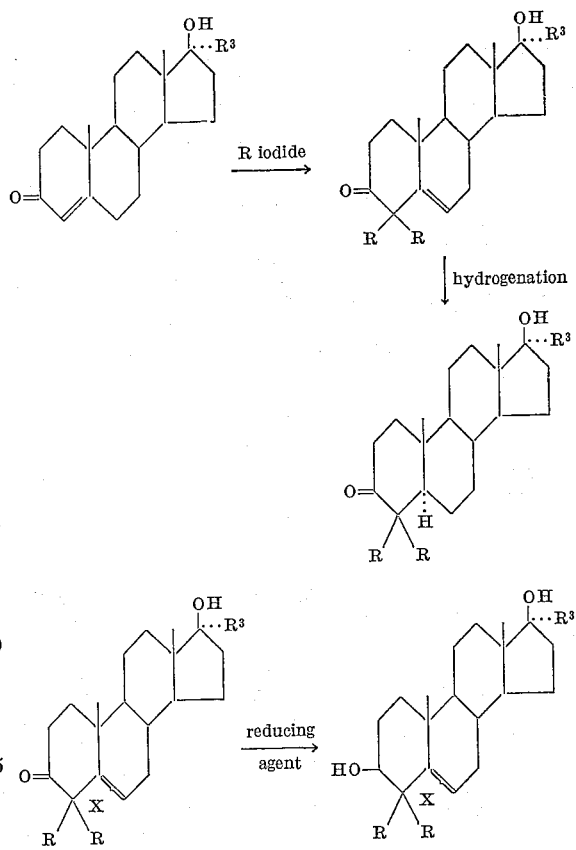

In the above equations R and X represent the same groups as heretofore. R³ may represent hydrogen or is the same as R² as previously defined.

In practicing the process as outlined above testosterone or the 17α-lower alkyl derivatives of testosterone such as 17α-methyl testosterone or 17α-ethyl or 17α-propyl testosterone are added to a tertiary alcohol solution of potassium metal. There is then added a lower alkyl iodide such as methyl iodide and the mixture is stirred at room temperature for a period of time of the order of four hours under a nitrogen atmosphere. The reaction mixture was then poured into water, the organic solvent removed by vacuum distillation and the precipitate purified to give the corresponding 4,4'-di lower alkyl-Δ⁵-androsten-17β-ol-3-one compound or its 17α-lower alkyl derivative. The 4,4'-di lower alkyl-Δ⁵-androsten-17β-ol-3-one compounds were then conventionally esterified by reaction with acid anhydride of hydrocarbon carboxylic acids of less than 12 carbon atoms in pyridine or with acid chlorides to give the corresponding 17-esters.

Hydrogenation of the Δ⁵-compounds thus prepared in the presence of a hydrogenation catalyst preferably a palladium catalyst, at a temperature slightly over room temperature until slightly more than 1 equivalent of hydrogen had been taken up gave the corresponding androstane derivatives. In this instance also conventional esterification gave the corresponding 17-esters of hydrocarbon carboxylic acids of less than 12 carbon atoms with the secondary 17-hydroxy groups.

As indicated in the second process equation above treatment with a reducing agent of 4,4'-di lower alkyl-Δ⁵-androsten-17β-ol-3-one compounds, the equivalent saturated androstane compounds and the 17-lower alkyl derivatives of both gave the corresponding 3β-hydroxy derivatives. Conventional esterification gave 3,17-diesters where a secondary 17-hydroxy group was present and 3-mono esters of those compounds having a 17α-lower alkyl group and consequently a tertiary 17-hydroxy group.

The following specific examples serve to illustrate but are not intended to limit the present invention.

*Example I*

2 g. of potassium metal was dissolved in 100 cc. of t-butanol, under an atmosphere of nitrogen. 5 g. of testosterone was added to the solution and when it had dissolved, there was added 6.5 cc. of methyl iodide and the mixture was stirred at room temperature for 4 hours under an atmosphere of nitrogen. It was then poured into water, the organic solvent was removed by vacuum distillation and the precipitate was collected and washed to neutral. Crystallization from acetone afforded 4,4′-dimethyl-Δ5-androsten - 17β - ol-3-one with M.P. 198–201° C. [α]$_D$ —10° (chloroform).

When in the above procedure methyl iodide was substituted by ethyl iodide or propyl iodide, there was obtained respectively 4,4′-diethyl-Δ5-androsten-17β-ol-3-one and 4,4′-dipropyl-Δ5-androsten-17β-ol-3-one.

By conventional reaction with acetic anhydride in pyridine there was prepared the 17-acetate derivative of all the above compounds. In a similar conventional way there was also prepared other esters such as the propionates, benzoates and cyclopentylpropionates.

*Example II*

5 g. of 17α-methyl-testosterone was treated in exactly the same way as described in Example I for testosterone, thus giving 4,4′,17α-trimethyl-Δ5-androsten-17β-ol-3-one with M.P. 194–196° C., [α]$_D$ —32° (chloroform).

When in the above example methyl iodide was substituted by ethyl iodide or propyl iodide, there was obtained respectively 4,4′-diethyl-17α-methyl-Δ5-androsten-17β-ol-3-one and 4,4′-dipropyl-17α-methyl-Δ5-androsten-17β-ol-3-one.

Similarly, the corresponding 17α-ethyl and 17α-propyl derivatives were obtained starting from 17α-ethyl and 17α-propyl testosterone, respectively.

*Example III*

One gram of 4,4′-dimethyl-Δ5-androsten-17β-ol-3-one was added to a suspension of 300 mg. of 5% palladium on charcoal catalyst previously hydrogenated in 50 cc. of methanol. The compound was hydrogenated at 25° C. and atmospheric pressure until the equivalent of 1.1 mols of hydrogen had been absorbed (3 hours). The catalyst was filtered and the solution evaporated. The residue crystallized from acetone-hexane to give 4,4′-dimethyl-androstan-17β-ol-3-one with M.P. 145–147° C., [α]$_D$ —12° (chloroform).

By conventional reaction with acetic anhydride in pyridine there was prepared the 17-acetate derivative of the above compound. In a similar conventional way there was also prepared other esters such as the propionates, benzoates and cyclopentylpropionates.

*Example IV*

The treatment of 4,4′,17α-trimethyl-Δ5-androsten-17β-ol-3-one by the method described in Example III afforded 4,4′,17α-trimethyl-androstan-17β-ol-3-one with M.P. 183–185° C., [α]$_D$ —35° (chloroform).

*Example V*

One gram of 4,4′-dimethyl-Δ5-androsten-17β-ol-3-one was dissolved in 50 cc. of methanol and mixed with a solution of 200 mg. of sodium borohydride in 5 cc. of water and the mixture was kept standing for 16 hours. It was then poured into a mixture of salt water and ice, the excess of hydride was decomposed by the addition of a few drops of acetic acid and the precipitate was filtered. Crystallization from acetone-hexane afford 4,4′-dimethyl-Δ5-androsten-3β,17β-diol with M.P. 216–218° C., [α]$_D$ —82° (ethanol).

This compound exhibited anti-androgenic (chick) and antiestrogenic (mouse) activity.

By conventional reaction with acetic anhydride in pyridine there was prepared the 3,17-diacetate derivative of the above compound. In a similar conventional way there was also prepared other esters such as the propionates, benzoates and cyclopentylpropionates.

*Example VI*

The treatment of 4,4′,17α-trimethyl-Δ5-androsten-17β-ol-3-one by the procedure described in Example V yielded 4,4′,17α-trimethyl - Δ5 - androsten-3β,17β-diol with M.P. 216–220° C., [α]$_D$ —100° (ethanol).

This compound exhibited anti-estrogenic activity.

By conventional reaction with acetic anhydride in pyridine there was prepared the 3-monoacetate derivative of the above compound. In a similar conventional way there was also prepared other esters such as the propionates, benzoates and cyclopentylpropionates

*Example VII*

When the method described in Example III was applied to the compounds obtained in accordance with Examples V and VI, there was obtained respectively 4,4′ - dimethyl - androstan - 3β,17β - diol with M.P. 245–247° C., [α]$_D$ —16° (ethanol), and 4,4′,17α-trimethyl-androstan-3β,17β-diol with M.P. 230–234° C., [α]$_D$ —28° (ethanol).

By conventional reaction with acetic anhydride in pyridine there was prepared the 3,17-diacetate of 4,4′-dimethyl-androstan-3β,17β-diol and the 3-monoacetate of 4,4′,17α-trimethyl-androstan-3β,17β-diol. In a similar conventional way there was prepared other esters such as the propionates, benzoates and cyclopentylpropionates.

We claim:

1. A process for the production of a compound selected from the group consisting of 4,4′-di lower alkyl-Δ5-androsten-17β-ol-3-one and 4,4′-di lower alkyl-17α-lower alkyl-Δ5-androsten-17β-ol-3-one comprising reacting a corresponding compound selected from the group consisting of Δ4-androsten-17β-ol-3-one and 17α-lower alkyl-Δ4-androsten-17β-ol-3-one with an alkyl iodide in the presence of potassium t-butoxide.

2. A process for the production of a compound selected from the group consisting of 4,4′-di lower alkyl-androstan-17β-olo-3-one and 4,4′-dialkyl-17α-lower alkyl-androstan-17β-ol-3-one comprising hydrogenating a corresponding Δ5-compound in the presence of a hydrogenation catalyst.

3. A process for the production of compound selected from the group consisting of 4,4′-di lower alkyl-Δ5-androsten - 3β,17β - diol, 4,4′-di lower alkyl-androstan-3β,17β-diol, 4,4′-di lower alkyl - 17α - lower alkyl-Δ5-androsten-3β,17α-diol and 4,4′-di lower alkyl-17α-lower alkyl-androstan-3β,17β-diol comprising treating the corresponding 3-ketone with a reducing agent.

4. The process of claim 1 wherein the iodide is a lower alkyl iodide and the 17-alkyl group is a lower alkyl.

5. The process of claim 2 wherein the alkyl groups are lower alkyl and the hydrogenation catalyst is a palladium catatlyst.

6. The process of claim 3 wherein the alkyl groups are lower alkyl and the reducing agent is sodium borohydride.

7. A compound of the following formula:

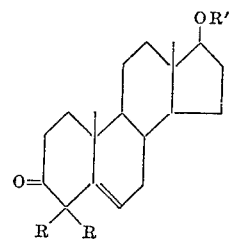

wherein R represents lower alkyl, and R' is selected from the group consisting of hydrogen and hydrocarbon carboxylic acyl group of less than 12 carbon atoms.

8. 4,4'-di lower alkyl-Δ⁵-androsten-17β-ol 3-one.
9. 4,4'-dimethyl-Δ⁵-androsten-17β-ol-3-one.
10. A compound of the following formula:

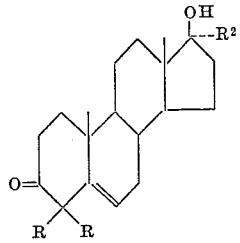

wherein R represents lower alkyl, and $R^2$ represents lower alkyl.

11. 4,4'-di lower alkyl-17α-lower alkyl-Δ⁵-androsten-17β-ol-3-one.
12. 4,4',17α-trimethyl-Δ⁵-androsten-17β-ol-3-one.
13. 4,4-dialkyl-17β-acyloxy-5-androsten-3-one wherein the alkyl group contains from one to four carbon atoms, inclusive, and wherein the acyl group is of a hydrocarbon carboxylic acid containing from one to eigth carbon atoms, inclusive.
14. 4,4-dimethyl-17β-acetoxy-5-androsten-3-one.
15. 4,4,17α-trimethyl-17β-hydroxy-5-androsten-3-one.
16. A process for the production of 4,4-dimethyl-17β-hydroxy-5-androsten-3-one which comprises: reacting testosterone with methyl halide in the presence of an alkali metal tertiary alkoxide to obtain 4,4-dimethyl-17β-hydroxy-5-androsten-3-one.

17. A process for the production of 4,4-dimethyl-17β-acyloxyl-5-androsten-3-one wherein the acyl group is of an organic carboxylic acid containing from one to eight carbon atoms, inclusive, which comprises: reacting testosterone with methyl halide in the presence of an alkali metal tertiary alkoxide to obtain 4,4-dimethyl-17β-hydroxy-5-androsten-3-one and esterifying with an acylating reagent selected from the group consisting of halides and anhydrides of organic carboxylic acids containing from one to eight carbon atoms, inclusive, to obtain 4,4-dimethyl-17β-acyloxy-5-androsten-3-one.

18. A process for the production of 4,4-dimethyl-17β-acetoxy-5-androsten-3-one which comprises: reacting testosterone with methyl iodide in the presence of an alkali-metal tertiary alkoxide to obtain 4,4-dimethyl-17β-hydroxy-5-androsten-3-one, and esterifying the thus-produced 4,4 - dimethyl - 17β-hydroxy-5-androsten-3-one with acetic anhydride to obtain 4,4-dimethyl-17β-acetoxy-5-androsten-3-one.

19. A process for the production of 4,4,17α-trimethyl-17β-hyroxy-5-androsten-3-one which comprises. reacting methyl-testosterone with methyl halide in the presence of an alkali-metal tertiary alkoxide to obtain 4,4,17α-trimethyl-17β-hydroxy-5-androsten-3-one.

References Cited in the file of this patent

Adams, et al.: J. Chem. Soc. (London), 1956, pp. 4490–95.